United States Patent
Waugh

(10) Patent No.: US 10,216,218 B2
(45) Date of Patent: Feb. 26, 2019

(54) PROVIDING COUNT VALUE BETWEEN DOMAINS

(71) Applicant: ARM LIMITED, Cambridge (GB)

(72) Inventor: Alex James Waugh, Cambridge (GB)

(73) Assignee: ARM Limited, Cambridge (GB)

(*) Notice: Subject to any disclaimer, the term of this patent is extended or adjusted under 35 U.S.C. 154(b) by 241 days.

(21) Appl. No.: 15/227,051

(22) Filed: Aug. 3, 2016

(65) Prior Publication Data
US 2017/0060175 A1 Mar. 2, 2017

(30) Foreign Application Priority Data
Aug. 25, 2015 (GB) .................................. 1515077.4

(51) Int. Cl.
*G06F 1/12* (2006.01)
*G06F 1/26* (2006.01)

(52) U.S. Cl.
CPC . *G06F 1/12* (2013.01); *G06F 1/26* (2013.01)

(58) Field of Classification Search
CPC .................................... G06F 1/12; G06F 1/26
See application file for complete search history.

(56) References Cited

U.S. PATENT DOCUMENTS

| 2004/0205368 | A1 | 10/2004 | Lange-Pearson et al. |
| 2010/0189206 | A1 | 7/2010 | Kagan |
| 2013/0042135 | A1* | 2/2013 | Lopez-Aguado ......... G06F 1/12 713/400 |
| 2013/0080820 | A1* | 3/2013 | Swoboda ................ G06F 13/38 713/600 |
| 2014/0075235 | A1 | 3/2014 | Chandhoke et al. |

OTHER PUBLICATIONS

Combined Search and Examination Report for GB1515077.4, dated Mar. 16, 2016, 7 pages.

* cited by examiner

*Primary Examiner* — Terrell S Johnson
(74) *Attorney, Agent, or Firm* — Nixon & Vanderhye P.C.

(57) ABSTRACT

An apparatus includes control circuitry configured to receive a first N-bit count value in a first domain, and to determine an M-bit increment indicating value based on the first N-bit count value and a reference value, where M<N. Boundary circuitry is configured to provide the M-bit increment indicating value to a second domain. In the second domain, updating circuitry configured to update a second N-bit count value based on an increment represented by the M-bit increment indicating value provided by the boundary circuitry.

22 Claims, 6 Drawing Sheets

FIG. 3

PROVIDING COUNT VALUE BETWEEN DOMAINS

This application claims priority to GB Patent Application No. 1515077.4 filed 25 Aug. 2015, the entire contents of which is hereby incorporated by reference.

BACKGROUND

Technical Field

The present technique relates to the field of data processing. More particularly, it relates to providing a count value between domains.

Technical Background

An apparatus may include one or more domains. In some examples, it may be desirable to update a second count value in a second domain based on a first count value in a first domain. However, transferring the count value across the domain boundary can be expensive in terms of hardware.

SUMMARY

At least some examples provide an apparatus comprising:
control circuitry configured to receive a first N-bit count value in a first domain, and to determine an M-bit increment indicating value based on the first N-bit count value and a reference value, wherein M<N;
boundary circuitry configured to provide the M-bit increment indicating value to a second domain; and
updating circuitry configured to update a second N-bit count value in the second domain based on an increment represented by the M-bit increment indicating value provided by the boundary circuitry.

In another example, the present technique provides a method comprising:
receiving a first N-bit count value in a first domain;
determining an M-bit increment indicating value based on the first N-bit count value and a reference value, wherein M<N;
providing the M-bit increment indicating value to a second domain using boundary circuitry; and
updating a second N-bit count value in the second domain based on an increment represented by the M-bit increment indicating value provided by the boundary circuitry.

In another example, the present technique provides an apparatus comprising:
means for receiving a first N-bit count value in a first domain, and to determine an M-bit increment indicating means based on the first N-bit count value and a reference value, wherein M<N;
means for providing the M-bit increment indicating means to a second domain; and
means for updating a second N-bit count value in the second domain based on an increment represented by the M-bit increment indicating means provided by the boundary means.

Further aspects, features and advantages of the present technique will be apparent from the following description of examples, which is to be read in conjunction with the accompanying drawings.

BRIEF DESCRIPTION OF THE DRAWINGS

FIG. 3 shows an example of different encodings which may be used to provide a count value between two domains;

DESCRIPTION OF EXAMPLES

Figure 1:
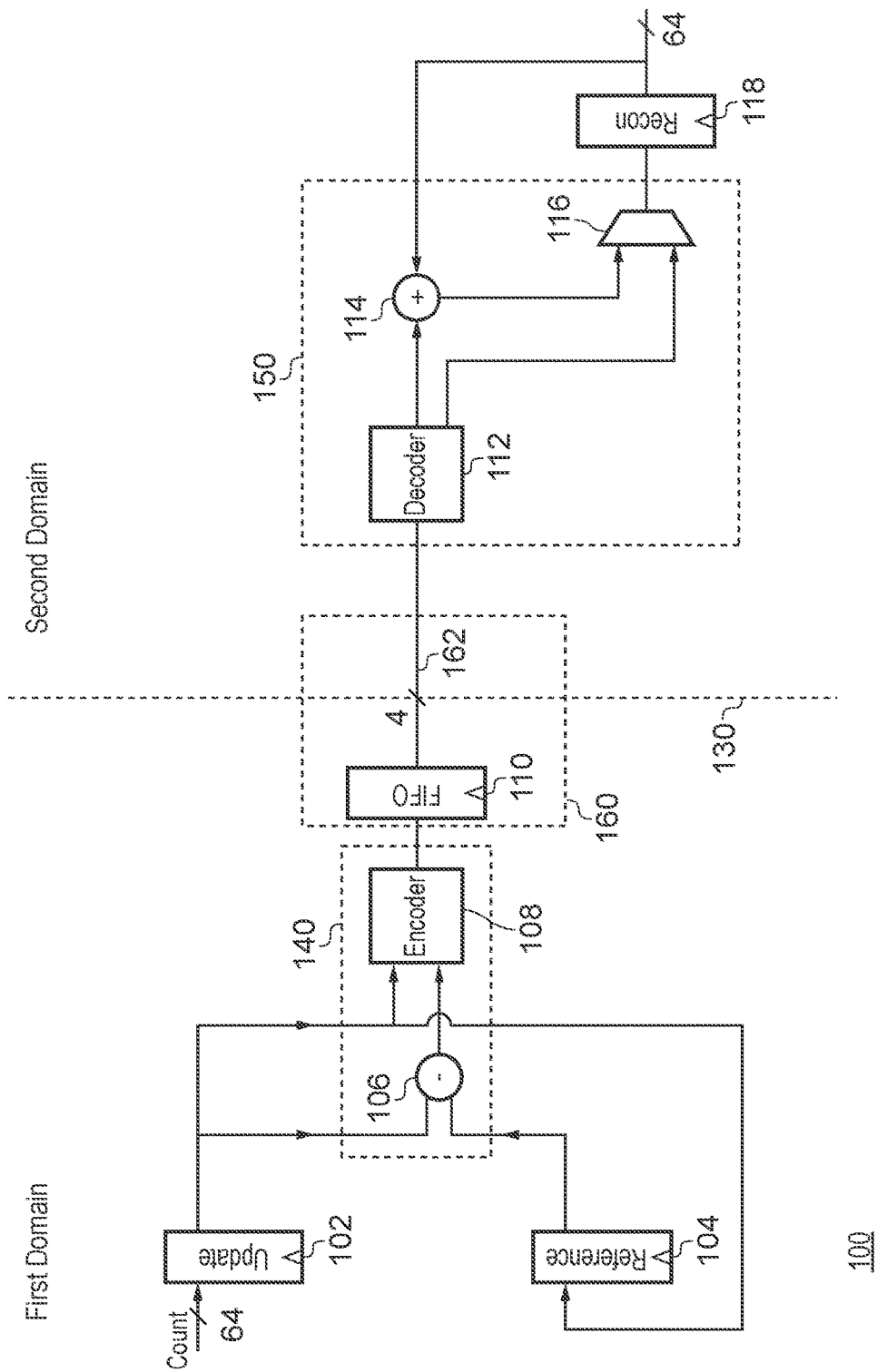
FIG. 1 schematically illustrates an example of an apparatus for providing a count value between domains.

Some apparatuses may include two or more domains, between which it can be useful to provide a count value. For example, a count value may be received in a first domain, but not a second domain. Aligning different versions of the count value in different domains allows operations in the two domains to be performed coherently. The count value may in some cases be relatively wide, for example, N-bits. Including N-bit boundary circuitry which is wide enough to provide the entire count value at once can be expensive in terms of hardware and power consumption. The present technique recognises that the count value may be compared to a reference value, and an M-bit increment indicating value based on this comparison may be transmitted to the second domain, rather than the full N-bit count value, where M is less than N. This reduces the requirement of relatively wide boundary circuitry between the domains. A second count value in the second domain may then be updated based on the M-bit increment indicating value. This can achieve coherency between the first and second count values in the first and second domains, with less hardware cost.

The increment indicating value may be a first increment indicating value corresponding to an increment to be applied to a set of least significant bits of the second count value. Therefore, the increment indicating value may be used to make small, fine grain, updates to the second count value.

Also, the increment indicating value may comprise a second increment indicating value indicating an increment to be applied to a set of more significant bits than the least significant set of bits of the second count value. In this way, a wider numeric range of increments can be encoded using the M-bit increment value.

The apparatus may operate such that when a difference between the first N-bit count value and the reference value is less than a threshold value, the control circuitry provides the first M-bit increment indicating value to the boundary circuitry, and when the difference between the first N-bit count value and the reference value is greater than the threshold value, the control circuitry provides a least one of the second M-bit increment indicating value to the boundary circuitry. When the first N-bit count value equals the threshold, either approach could be used. By determining which of the first and second M-bit increment indicating values to provide based on the threshold value, the apparatus may update the second N-bit count value according to a larger range of increments.

The apparatus may be configured such that when the difference between the N-bit count value and the reference value is greater than the threshold value, a combination of at least one of the second M-bit increment indicating values, and zero, one or more first M-bit increment indicating values may be provided, wherein a total increment represented by the combination of increment indicating values corresponds to the difference between the first N-bit count value and the reference value. The second increment indicating values may only be able to increment the second count value by certain multiples, so by combining these with a first increment value when required, a continuous range of increment amounts can be encoded.

The M-bit increment indicating value may comprise an H-bit header and a P-bit payload, where H+P=M. The H-bit header can be indicative of which bits of the second N-bit count value are to be updated by an increment indicated by the P-bit payload. Hence, the H-bit header may represent which encoding is used for the P-bit payload. For example, the H-bit header may indicate whether the increment indicating value is a first or second increment indicating value as discussed above.

In response to a given M-bit increment indicating value of this form, the updating circuitry of the apparatus may update the second N-bit count value by an increment of "INC", where:

$$INC=Q \times 2^{jP}$$

and where Q is the value represented by the P-bit payload, and j is the value represented by the H-bit header. The header value j may be in the range 0 to $2^{H-1}$. Encoding the M-bit increment indicating value in this manner allows relatively large increment values to be represented by a smaller number of bits. This reduces the cost of updating a count value in a different domain.

In response to a predetermined condition, the control circuitry may encode an absolute value of the first N-bit count value as a plurality of M-bit values to be provided to the second domain by the boundary circuitry, and the updating circuitry may set the second N-bit count value to the absolute value represented by the plurality of M-bit values provided from the boundary circuitry. For example, sometimes the first N-bit count value may change so much that it is more efficient to simply transfer the N-bit count in M-bit chunks rather than transmitting a series of increments. Allowing for an encoding where the absolute value is sent, in addition to the increment encodings, can provide a more efficient system overall.

For example, the predetermined condition may comprise at least one of: a power up condition, a reset condition, a difference between the first N-bit count value and the reference value being greater than a predetermined value, and an error wherein the reference value is unavailable. In the above conditions, it may be more efficient to provide the absolute first N-bit count value as a plurality of M-bit values, rather than providing a combination of M-bit increment indicating values.

The control circuitry may provide a prefix packet before sending the series of M-bit values for encoding the absolute value of the first N-bit count value, in order to notify the update circuitry that the plurality of M-bit values correspond to the first N-bit count value. For example, a predetermined M-bit value may be reserved for the prefix packet to distinguish it from encoded increment values. For example, the predetermined M-bit value may be a value where all M bits are zero. The all-zero encoding of an M-bit value is unlikely to be required for encoding increment values (since an increment of zero means there is no change to the count values since the last update), so this encoding can be reused to indicate the prefix packet. By using a prefix packet, the subsequent M-bit values may each correspond to an M-bit chunk of the first N-bit count value, rather than requiring any header to indicate an encoding type, which can allow the absolute value of the N-bit count value to be transmitted in fewer M-bit packets.

The control circuitry may perform a series of count value updating operations, where each count value updating operation comprises receiving an updated first N-bit count value, and determining based on a comparison of the updated first N-bit count value and the reference value at least one M-bit value to be provided to the boundary circuitry for updating the second N-bit count value to correspond to the updated first N-bit count value. By configuring the apparatus to perform a series of count value updating operations, coherency between the first domain and the second domain can be maintained over time.

The reference value for a given count value updating operation may comprise the updated first N-bit count value received for a preceding count value operation. Hence, the reference value may represent the value which the second N-bit count value is expected to have once any outstanding M-bit packets for the preceding count value operation have been processed by the updating circuitry. Hence, comparing the updated first N-bit count value with the reference value enables the control circuitry to identify the increment to be sent to the second domain to update the second N-bit count value in a corresponding way.

By the time the M-bit values for a given updating operation have reached the second domain, the first count value may have moved on, so the second count value may lag the first count value. By providing prediction circuitry for predicting a transit time for at least one previous M-bit value provided to the updating circuitry by the boundary circuitry, and determining an adjusted first N-bit count value based on the predicted transit time, the control circuitry may determine the at least one M-bit value to be provided to the updating circuitry based on the adjusted first N-bit count value, so that the M-bit values provided to the second domain represent the value which the first count value is predicted to have by the time that the M-bit values have been processed in the second domain. This can improve coherency between the first N-bit count value and the second N-bit count value.

The prediction circuitry may predict the transit time based on monitoring of a length of time between the control circuitry providing a first M-bit value to the boundary circuitry for a given count value updating operation and the updating circuitry receiving a last M-bit value from the boundary circuitry for the given value updating operation. A transit time predicted in this way may provide a reasonable estimate of how long a future update of the second N-bit count value may take. The transit time may be measured in terms of processing cycles or in increments of the count value itself.

The control circuitry may comprise an S-bit subtractor to subtract S-bit portions of the first N-bit count value and the reference value, where S<N. Including a subtractor that is smaller than N reduces the hardware costs and power consumption of the apparatus. In practice, if the difference between the first count value and the reference value would require more than S bits to change, then it may be more efficient to transmit the absolute value of the updated count value in chunks, rather than encoding a series of increments, so a larger subtractor may in any case be redundant.

The apparatus may be configured such that in response to detection of an overflow condition in a subtraction performed by the S-bit subtractor, the control circuitry may encode an absolute value of the first N-bit count value as a plurality of M-bit values to be provided to the second domain by the boundary circuitry.

The updating circuitry may similarly include an S-bit adder to add the increment value represented by the M-bit increment value provided by the boundary circuitry to the second N-bit count value. Again, the hardware cost can be reduced by reducing the size of the adder to fewer than N bits.

The boundary circuitry of the apparatus may comprise at least one of an M-bit bus and an M-bit FIFO (first in, first out buffer). Providing a wider bus or FIFO buffer can be relatively expensive, especially if the domains have different clock signals or voltage levels, or are separated by relatively large distances. Hence reducing the size of the bus or FIFO to M-bits can save hardware costs.

In some cases, the first and second domains may be clock domains using different clock signals. Therefore, the boundary circuitry may comprise synchronising circuitry for synchronising a maximum of M bits per processing cycle with a clock signal in the second domain. Providing synchronisers for synchronising all N bits can be very expensive, so the present technique can greatly reduce the cost of the boundary circuitry by limiting the synchronising circuitry to M-bits.

The domains could have different voltage levels, and hence the boundary circuitry may include a level shifter for shifting a voltage level for a maximum of M bits per processing cycle. Again, limiting the level shifter to M bits saves circuit area and power consumption.

In some examples, the count value may be any value which counts occurrences of some event in a processing system. For example, the count value may be a timestamp which counts the number of elapsed processing cycles. Alternatively, the count value may be a count of a number of executed instructions, number of exception events or interrupts of a given type that have occurred, number of errors detected, number of accesses to a given region of memory, etc.

However, the technique may be particularly useful where the first/second N-bit count values are first and second timestamps. For example, diagnostic circuitry in the first and second domains may generate diagnostic information (e.g. trace packets) indicating the occurrence of various events. To allow events in the first and second domains to be correlated, it may be desirable to pass a timestamp between the domains so that both domains may operate using a substantially common time reference. The present technique can be useful for reducing the cost of passing the timestamp over the domain boundary.

The increment represented by the M-bit incrementing indicating value could be a positive increment or a negative increment (or decrement). In the case of a positive increment, the updating circuitry would add the increment to the second N-bit count value, while for a negative increment, the updating circuitry may subtract the increment from the second N-bit count value.

Some examples may provide an encoding of the M-bit incrementing indicating value which allows for both positive and negative increments. For example, each increment indicating value could include a sign bit which indicates whether remaining bits indicate a positive or negative increment, or the increment indicating value could be encoded as a two's complement value. This could be useful for embodiments where the count value could increase or decrease over time. For example, if the count value indicates a number of remaining items to be processed, then the count value could be incremented as more items are received and decremented as previously received items are processed.

However, in many cases the count value may be a monotonically increasing or decreasing count value. For example, a timestamp may be expected to increase over time, or to count down towards zero. Hence, in some cases it may not be useful to encode both positive and negative increments. To increase the number of bits available in each M-bit increment value for encoding the increment amount, the M-bit increment value may not have any sign bit or other way of representing the sign of the increment. The updating circuitry could assume that all increments are either positive or negative. If the first N-bit count value changes in the opposite direction, then the absolute value can be sent in M-bit chunks as discussed above, rather than encoding the increment relative to the reference value.

FIG. 1 shows an example of an apparatus 100 having two domains separated by a domain boundary 130. For example, the domains could be different clock domains operating according to different clock signals, e.g. a system clock in the first domain and a core clock in the second domain. In this case, passing values across the domain boundary 130 can be expensive because synchronisers may be required for synchronising each bit of the value passed over the boundary with the clock in the new domain.

In another example, the domains could be different voltage domains which operate using different voltage levels. In this case, passing values over the boundary incurs a hardware cost because level shifters may be required to shift the voltage level of each bit passed over the boundary.

In other examples, the first and second domains could simply be different areas of a data processing system which are separated by a relatively large distance within an integrated circuit. In this case, the relatively long buses connecting the domains may impose a cost on transferring data between the domains.

In all of these cases, it may be desirable for a count value in a second domain to be updated to correspond with a count value in a first domain. For example, in the case where different debug or trace events are to be correlated by time, the different domains may need a common reference point from which to synchronise their debug events, and so a timestamp may be provided across the domain boundary. However, passing the entire timestamp over the boundary can be costly in terms of both circuit area and power consumption for the reasons given above.

As shown in FIG. 1, the first domain includes an updated count register 102, a reference register 104, a subtractor 106 and an encoder 108. As shown in FIG. 1, the subtractor 106 and encoder 108 can be considered to form control circuitry 140. In the second domain the apparatus comprises a decoder 112, an adder 114, a multiplexer 116 and a reconstruction register 118. The decoder 112, adder 114 and multiplexer 116 can be considered to form update circuitry 150. The control circuitry 140 and the update circuitry are connected by boundary circuitry 160 which includes a first in/first out (FIFO) buffer 110 and a four bit bus. The FIFO buffer 110 is 4-bits wide to correspond to the 4-bit bus, and has a depth of 1-bit. In other words, a FIFO having these parameter will be able to receive a single 4-bit packet at any time. However, it will be appreciated that the FIFO may be any number, M, bits wide and could have a greater depth (enabling two or more packets to be stored in the FIFO at a time). Similarly the bus bridging the first and second domains could be narrower or wider than 4 bits.

A 64-bit count value may be provided to the update register 102. The control circuitry subtracts a reference value from the 64-bit count value using the subtractor 106. When the system is first initialised, the reference value may be zero, and so the encoder 108 may effectively receive the full 64-bit count value itself. Prior to providing the 64-bit count value to the boundary circuitry, the encoder first sends a prefix packet to notify the update circuitry that a full 64-bit count value is due to be provided. The encoder then generates sixteen 4-bit chunks, each corresponding to four bits of the full 64-bit count value, and provides these one by one to the FIFO 110. The stream of 4-bit chunks is then sent from the FIFO 110, across the domain boundary to the update circuitry 150.

The control circuitry also stores the 64-bit count value in the reference register 104. The reference value represents the effective value to which the second count value will be updated following to receipt of the most recently provided batch of 4-bit chunks.

In the updating circuitry 150, the multiplexer 116 is connected to the decoder 112, and provides the decoded 4-bit chunks directly from the decoder 112, to the reconstruction register 118. Each 4-bit chunk is loaded into the reconstruction register 118 until eventually the full 64-bit count value stored.

At a later point, the update register 102 may subsequently receive an updated 64-bit count value. Accordingly, to represent the amount by which the first 64-bit count value has incremented relative to the effective value which the reconstructed count in register 118 will have once any outstanding packets from the FIFO 110 have been processed, the subtractor 106 subtracts the reference value from the updated 64-bit count value, and sends the result to the encoder 108. Based on the result, the encoder 108 then determines one or more 4-bit increment indicating values to be provided to the boundary circuitry 160.

When the difference between the count value and the reference value is small, in this case less than 8, a single fine encoding is sufficient for indicating the increment. For example, a difference of 3 may simply be represented as 4'b0011, where the most significant bit 0 is a header indicating that the count value at the reconstruction register should be incremented by 0b011.

Alternatively, when the difference between the count value and the reference value is larger, a coarse encoding, or a combination of one or more coarse encodings and zero or one fine encodings may be provided. For example, a difference of 32 may be represented as 4'b1100. In this case, the header is '1', and indicates that the count value in the reconstruction register should be incremented by a value of 4'b0100, left shifted by 3 bit positions, which is equivalent to an increment of 0b100000, i.e. 32. Similarly, a difference of 33 may be represented by a coarse encoding of 4'b1100 to achieve an increment of 32 in the same manner described above, followed by a fine encoding of 4'b0001 to achieve a further increment of 1, leading to a total increment of 33.

At a point when the difference between a new 64-bit count value and the reference value is of a certain size or larger, it will become more efficient to simply send the full 64-bit count value as 16 4-bit chunks. For example, with respect to the configuration shown in FIG. 1, once the difference becomes greater than 952, at least 18 coarse encodings would be required to represent the increment. Therefore, it is more efficient to simply send the full count value as the prefix package of 4'b000, and 16 4-bit chunks, requiring a total of 17 chunks. In this example, the threshold at which it becomes more efficient to provide the full count value occurs when fewer 4-bit transmissions are required in order to provide the full count value than the total number of 4-bit transmissions required to provide the increment. However, it will be appreciated that in practice this threshold may be lower for the purposes of power consumption or efficiency. In addition, absolute values could also be transmitted in response to other conditions. For example, a power on condition, a reset condition, or when an error occurs.

It will be appreciated that in this example the subtractor 106 in the first domain and the adder 114 in the second domain are 64-bit wide. However, in other examples of the present technique, the adder and subtractor may be S bits wide where S<N. In such an arrangement, when an overflow of the subtractor occurs, the control circuitry can be configured to provide the full N-bit count value in a series of M-bit chunks, similar to the case where a reference value is not available. For example, in the example discussed above S could be 10, since if more than 10 bits change when subtracting the count value in register 102 and the reference value in register 104, then the difference is at least 1024, i.e. greater than the threshold 952 where it becomes more efficient to transmit the absolute value of the updated count rather than successive increments. By reducing the size of the subtractor 106 to S bits, and similarly reducing the size of the adder 114 in a corresponding way, the hardware scale of the apparatus can be reduced. It will be appreciated that in other examples, the size S of adder/subtractor required may depend on the number of bits N in the full timestamps, and the number of payload bits P of each M-bit increment packet sent over the boundary 130.

Figure 2:
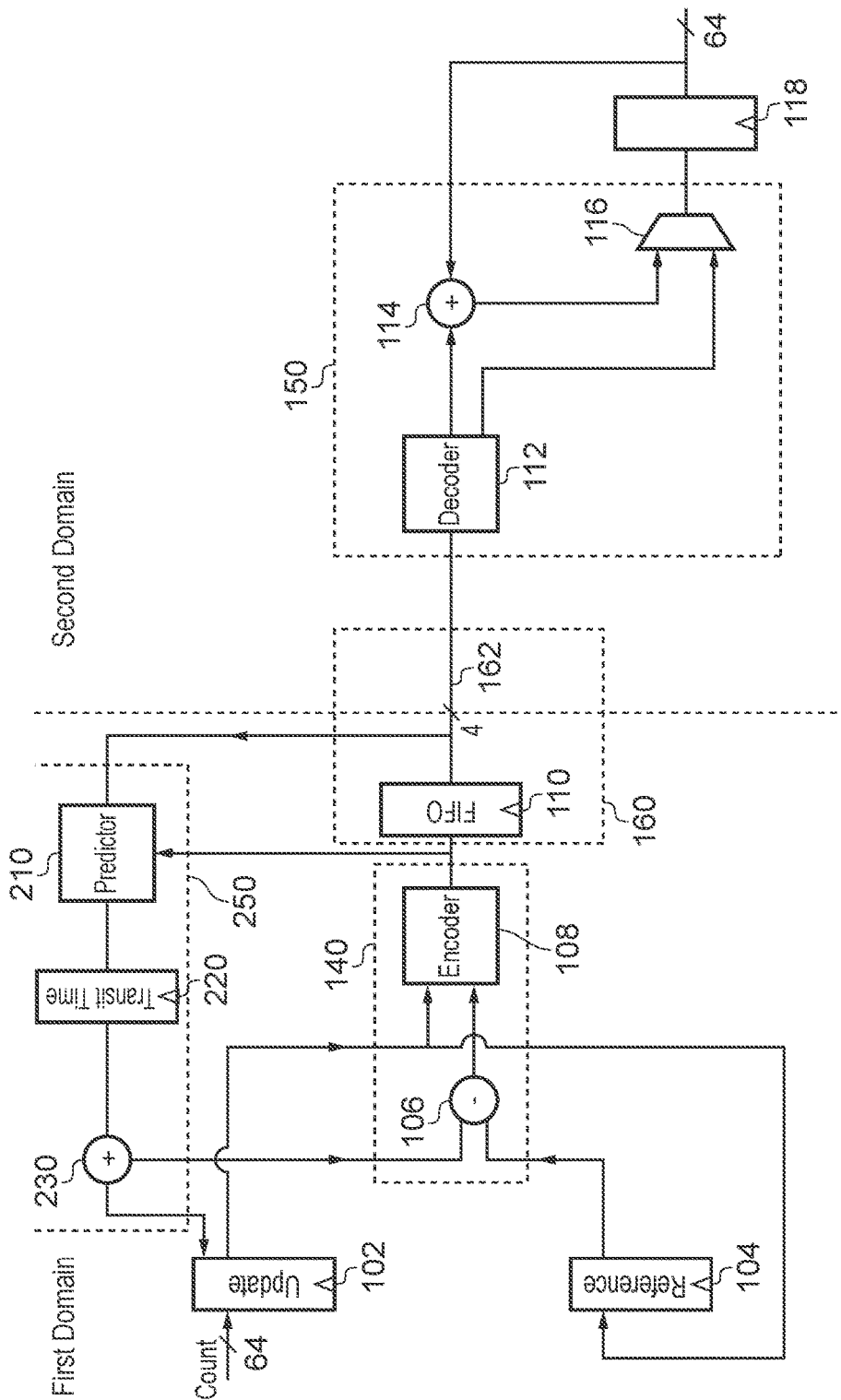
FIG. 2 schematically illustrates an example of an apparatus including prediction circuitry.

FIG. 2 schematically illustrates another example of apparatus 200 according to the present technique. The apparatus 200 of FIG. 2 includes the components of FIG. 1, and description of these components will not be repeated. However, the apparatus of FIG. 2 also includes prediction circuitry 250. The prediction circuitry 250 includes a predictor 210, a transit time register 220 and an adder 230. Each time the encoder 108 generates a series of one or more 4-bit packets for updating the reconstructed count 118 in response to a change to the count in register 112, the predictor 210 monitors the time between the provision of a first 4-bit packet from the encoder 108 to the FIFO 110, and the reading of the last 4-bit packet from the FIFO 110 to the decoder 112. For example, when the apparatus 200 provides a full 64-bit count value to the updating circuitry 150, the predictor 210 records the time at which the prefix packet is sent to the FIFO 110, and the time at which the last 4-bit chunk of the full 64-bit count value is read from the FIFO 110 by the updating circuitry 16. On the other hand, when the apparatus is performing a smaller update using a single fine encoding, the predictor 210 simply records the point at which the 4-bit increment packet enters the FIFO 110 and the point at which the 4-bit increment leaves the FIFO 110. Similarly, when the control circuitry provides a plurality of coarse encodings, or a combination of coarse encodings and fine encodings, to indicate an increment to the updating circuitry, the prediction circuitry monitors the time at which a first 4-bit packet of that update event enters the FIFO, and the time at which the last 4-bit packet leaves the FIFO. In all examples, the difference between these two points is the transit time of the provision, and as will be described below, may be used to improve coherency between the first domain and the second domain.

It may be typical that new count values are received at relatively regular intervals, and require similar increments to the count value stored in the reconstruction register 118 for coherency to be maintained. Therefore the transit time of a previous combination of 4-bit increment indicating values can be an estimate of the transit time for a subsequent combination of 4-bit increment indicating values. Even in the case where new count values are not received at regular intervals, and require larger increments for coherency to be maintained, the predictor 210 may determine an average of transit times during multiple updates of the reconstruction register 118. The monitored transit time is stored in the transit time register. An adder 230 then adds this transit time to any new count values received by the update register 102, and the control circuitry 140 determines a 4-bit increment indicating value based on the difference between the sum of the new count value and the transit time, and the reference value. Therefore, the 4-bit increment indicating value, or values, provided to the update circuitry 150 are reflective not the of count value received at the update register 102, but instead of what the count value is predicted be at the update register 102 once the updated value has been reconstructed in the reconstruction register 118. This improves the coherency between the count values stored in the two domains.

The prediction circuitry may continue to monitor the transit time 220 to check it is correct and update it if required. For example, the prediction circuitry may include a confidence counter which is set to a given value when the predicted transit time is updated in register 220, incremented when the actual transit time for a given series of one or more FIFO packets is within a certain range of the predicted transit time, and decremented when the actual transit time is not within the predetermined range of the predicted transit time. When the confidence value drops below a given threshold, then the predicted transit time may be updated based on the actual transit time currently monitored. In this way, the odd incorrect prediction does not affect the prediction made, but if the prediction continues to be incorrect then the prediction is updated to be closer to the observed transit time.

Figure 3:
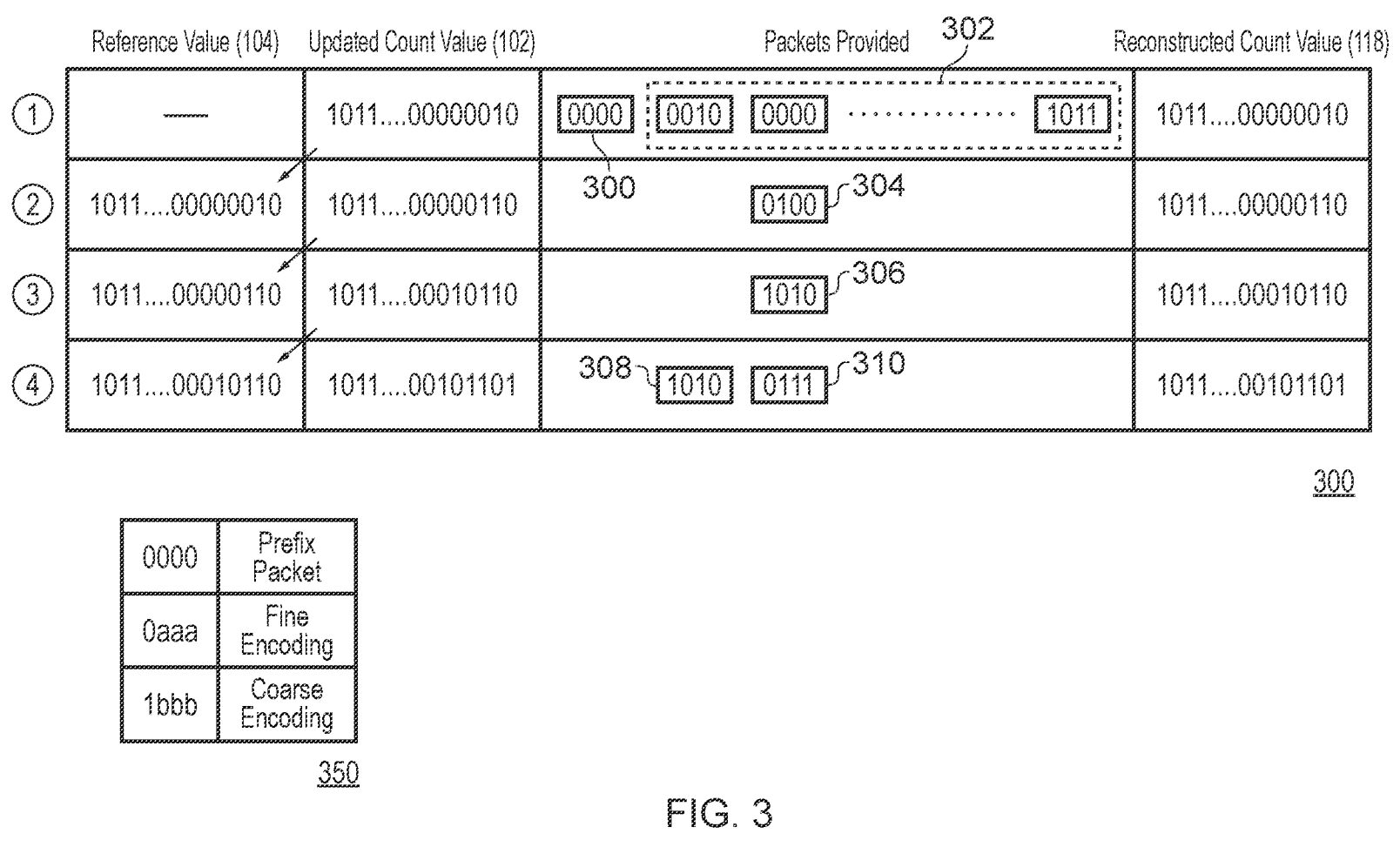

FIG. 3 shows table 300 including example streams of encodings which may be transmitted from the first domain to the second domain, and table 350 which shows an example of the different encodings included in the streams. Each row corresponds to a respective one of a series of count updating operations performed over time as successive updates to the count in the update register 102 are received.

In the first row, a first updated count value is received. In this example, this first count value is received at a point where there is no reference value. This may be the case following an initial power up of the apparatus 200, a reset condition, an error, or any other situation where the reference value is not available. Therefore, the apparatus 200 provides the full updated count value to the update circuitry 150. To do so, first a prefix package 300 is sent so that the updating circuitry 150 in the second domain is aware that a full count value is going to be provided. Subsequently, the full count value is provided in a stream of sixteen 4-bit packets 302. In the example shown in FIG. 3, the least significant four bits of the 64-bit count value is sent first, followed by subsequent packet each of more significance than the last. However, it will be appreciated that the series of 4-bit chunks may be sent in any order, including from the most significant bits to the least significant bits. As these packets follow a prefix packet, the updating circuitry is aware that they are not encoded according to any of the encodings shown in table 350. Therefore, all 4-bits of these packets are representative of 4-bit chunks of the full count value. Consequently, as the packets arrive at the updating circuitry, they are loaded into the reconstruction register 118 to form a reconstructed count value. The updated count value is also stored in the reference register as a reference value for use in a subsequent count updating operation.

In the second row, a second updated count value is received. At this point, the reference register stores a reference value which is equivalent to what the reconstructed count value in the reconstruction register will be once the packets transmitted in the first row have been processed. The control circuitry 140 may determine a difference between the reference value and the second updated count value, and provide a value indicative of this difference, rather than providing the full count value. In this case, the difference between the second count value and the reference value is only 4, which is represented by a single packet 304 according to the fine encoding. In the fine encoding, the most significant bit, also referred to as the header, of the packet 304 is '0'. This indicates that the remaining three bits of the 4-bit packet are to be applied to the three least significant bits of the count value in the reconstruction register. Therefore, when this packet is received by the updating circuitry, this information is decoded and the reconstructed count value is incremented by 4, to match the updated first count value. Similar to the first example, the updated count value is also stored as the new reference value, for the next count updating event.

In the third row, a third updated count value is received. This time, the difference between the reference value and the updated count value is a larger value of 16. This cannot be represented by the fine encoding used for the previous update. Therefore, a coarse encoding is used instead. As shown in table 350, a header of '1' is represents a coarse encoding. According to the coarse encoding, the remaining three bits are to be shifted by three bit positions before being applied the count value in the reconstruction register. Therefore the payload of the package 306 is '010', left shifted by three bit positions which is equivalent to a value of sixteen. Therefore, when this packet is received by the updating circuitry, the reconstructed count value is incremented by the appropriate value of sixteen.

In the fourth row, a fourth count value is received. In this case, the difference between the reference value and the updated count value is 23, which is too large be indicated by a single coarse encoding. Therefore, the control circuitry provides two packets, one according to the coarse encoding, and the other according to the fine encoding. The first packet 308, according to the coarse encoding, indicates an increment of '010' shifted by 3 bit positions, which is equivalent to an increment of 16. The second packet 310, according to the fine encoding, indicates an increment of '111' at the least significant bits of the reconstructed count value, which is equivalent to an increment of 7. Therefore, the two packets together indicate a total increment of 23.

As can be seen from the example described above, providing these encodings of the increment indicating values improves coherency between the updated count value and the reconstructed count value with less hardware requirements. However, it will be appreciated that these encodings are one example of the present technique, and that other encodings may also be used to achieve the similar effects. For example a two bit header would allow for a larger range of increments to be encoded. However, this reduces the size of the payload which can be delivered to the desired bits. Alternatively, the size of the header and the payload my be increased, which allows for larger increments to be made, but increases the hardware cost and power consumption of the apparatus. Hence, in general an H-bit header and a P-bit payload may be provided to allow an increment "INC" of:

$$INC = Q \times 2^{jP}$$

where Q is the value represented by the P-bit payload, and j is the value represented by the H-bit header. In the particular example of FIGS. 3, H=1 and P=3, but it will be appreciated that other values could be used.

Figure 4:
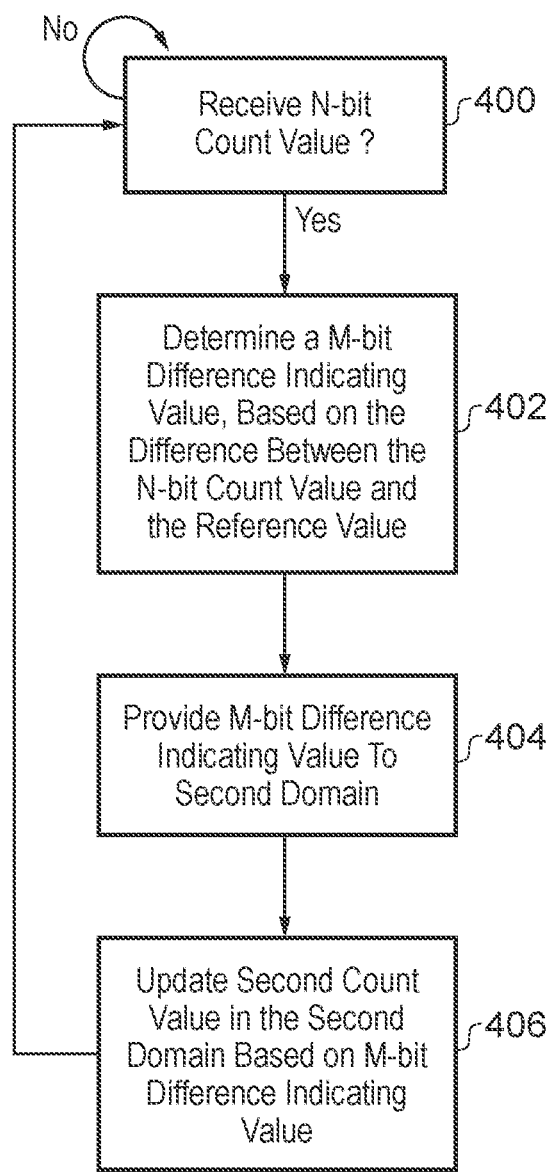
FIG. 4 illustrates a method for updating a count value.

FIG. 4 shows a method of updating a count value, for example a timestamp, according to the present technique. At step 400, the control circuit 140 waits for an N-bit count value to be received. When an N-bit count value is received, the process moves to step 402. In step 402, an M-bit increment indicating value is determined. This value is based on the difference between the N-bit count value and a reference value. Once the M-bit increment indicating value is determined, it is provided to the second domain in step 404. Following this, in step 406 a second count value in the second domain is updated based on the M-bit increment indicating value provided in the previous step. The system then returns to step 400 where the control circuit 140 waits for another count value to be received. While FIG. 4 shows the steps shown sequentially for a given count updating operation, it will be appreciated that the steps for a series of count updating operations may be pipelined and occur in parallel. For example, step 406 to update the second count value in response to a previous count updating operation may be performed in parallel with steps 400-404 for determining the M-bit values to be transmitted for a subsequent count updating operation.

Figure 5:
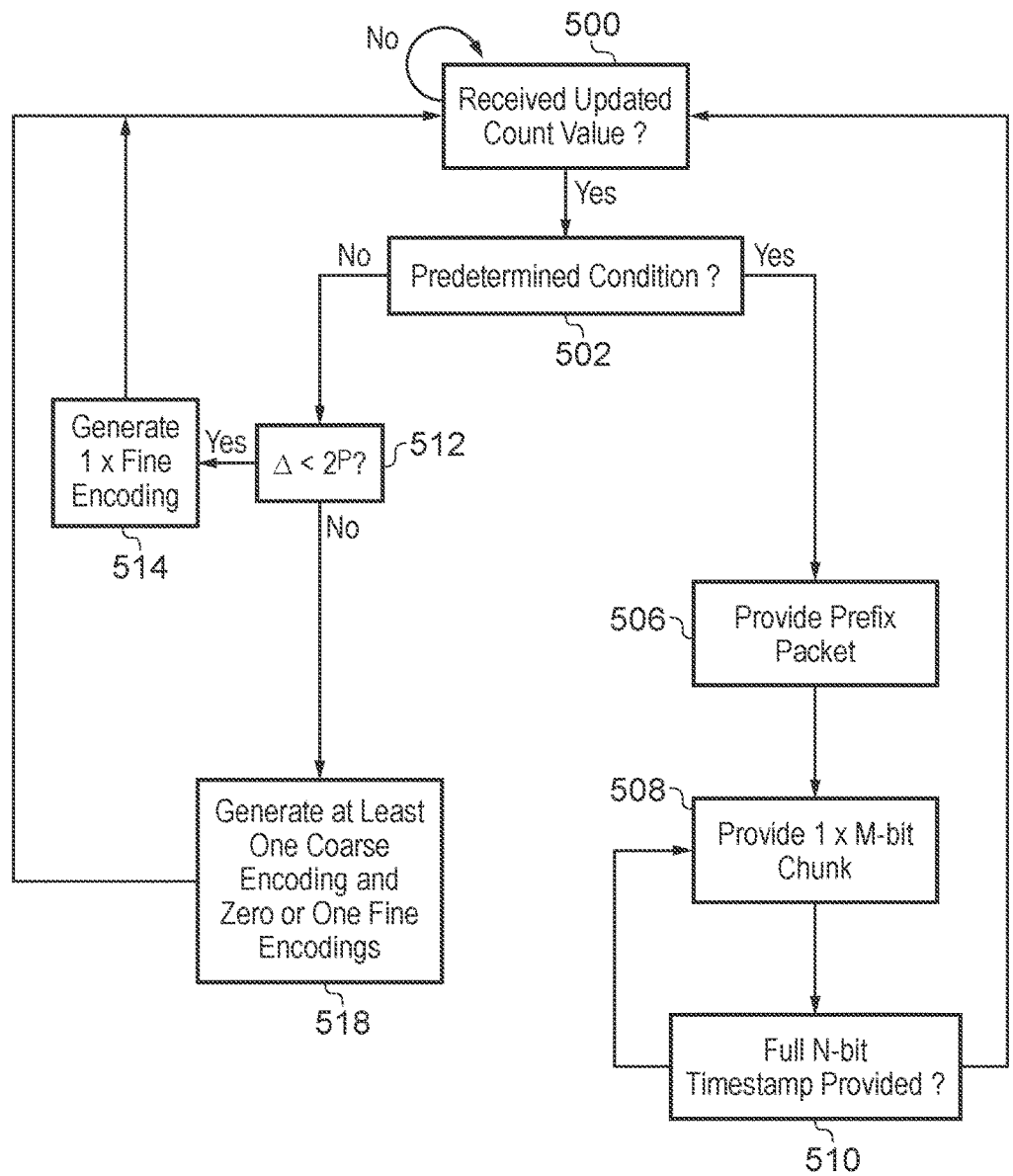
FIG. 5 illustrates a method for determining an encoding for providing a count value between domains.

FIG. 5 illustrates a method for determining an encoding for providing a count value between domains. In step 500 the control circuit 140 waits for an updated count value to be received. When an updated count value is received, the system proceeds to step 502. At step 502, it is checked whether a predetermined condition has occurred. The predetermined condition may be one of: a power up event when the apparatus is switched on for the first time, a reset event when the apparatus is reset, the difference between an updated timestamp and a reference value being larger than a predetermined value, or an error event, for example. If a predetermined condition has occurred, the process moves to step 506, when a prefix packet is provided to indicate that a full N-bit count value is going to be transmitted. In step 508, an M-bit chunk of the full N-bit count value is provided. Following this, in step 510, it is checked whether the full N-bit count value has been provided. If it has not, the process returns to step 508 and another M-bit chunk is provided. The steps of 508 and 510 are repeated until all chunks of the full N-bit count value are provided. The process then returns to step 500.

Alternatively, if it is determined at step 502 that a predetermined condition has not occurred, then the process proceeds to step 512. In step 512, it is checked whether the difference (delta) between the updated timestamp and a reference value is less than $2^P$ (where P is the number of bits of the payload available for encoding the increment). If delta is less than $2^P$, then a single fine encoding will be sufficient for indicating the difference. Therefore, the process can move on to step 514 and provide a single fine encoding indicative of the difference between the reference value and the updated timestamp. However, if delta is not less than $2^P$, then at step 518 at least one coarse encoding and zero or one fine encodings are provided, and the process returns to step 500.

Figure 6:
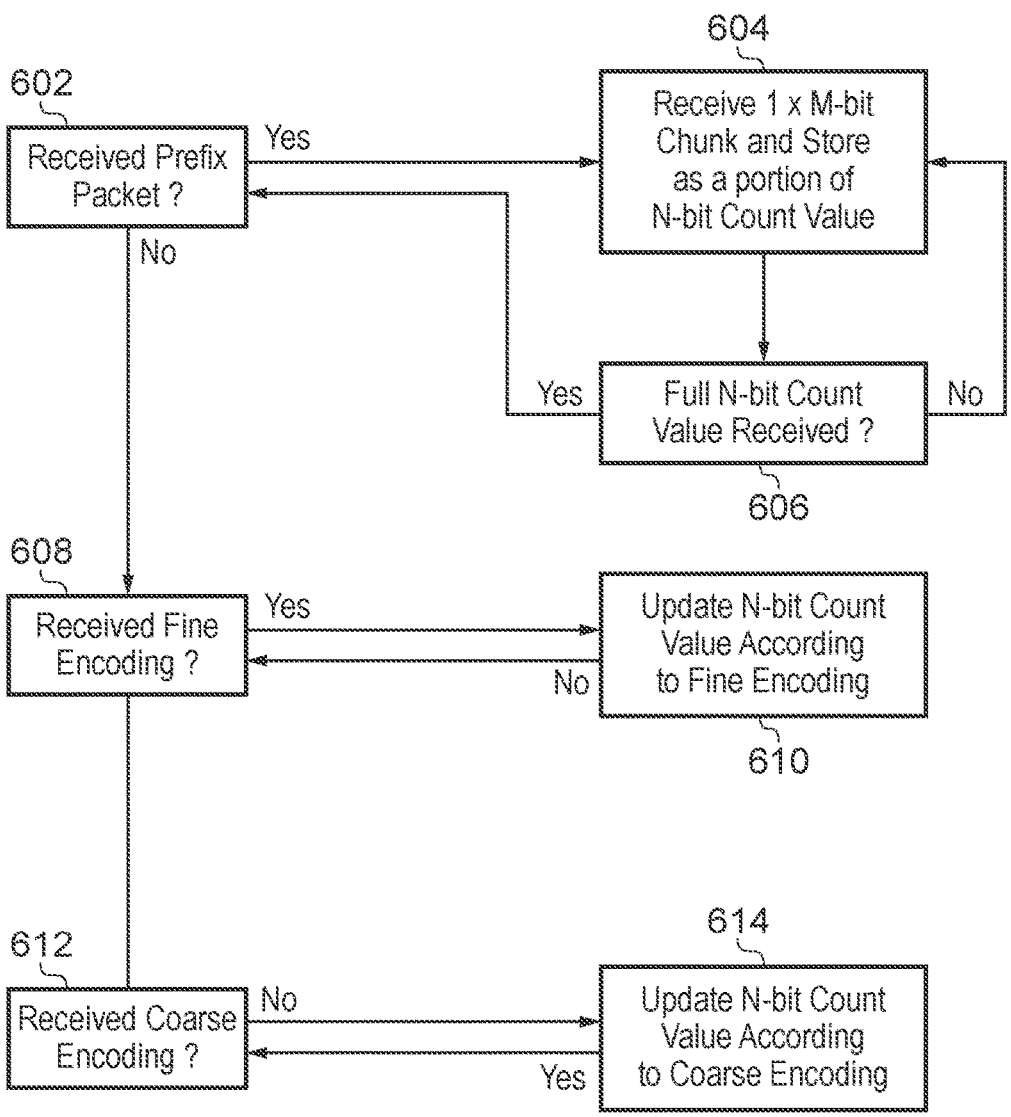
FIG. 6 illustrates a method for updating a count value in a second domain.

FIG. 6 illustrates a method for updating a count value stored in a second domain. In step 602, the update circuitry 150 checks whether a prefix packet has been received. If it has, the process moves to step 604 where a single M-bit chunk is received, and stored as a portion of an absolute N-bit count value. In step 606, if the full N-bit count value has not been received, the process moves back to step 604 and waits for the next M-bit chunk to be provided. However, if the full N-bit count value has been received, the process returns to step 602. If no prefix packets have been received, the process moves to step 608, and it is checked whether a fine encoding has been received. In the case where a fine encoding has been received, the process proceeds to step 610 and increments the N-bit count value according to the fine encoding. However, if no fine encoding has been received, the process moves to step 612 where a similar check is made for a coarse encoding. If a coarse encoding has been received, the process moves to step 614 and increments the N-bit count value according to the coarse encoding. If a coarse encoding has not been received, the process returns to step 602.

It will be appreciated the steps 602, 608 and 612 are cyclical, and may occur in any order, other than the order illustrated in FIG. 6. In addition, in some examples the receipt of a fine encoding or a coarse encoding may be more frequent than the receipt of a prefix package, and therefore the process may alternate between step 608 and 612 a number of times before returning to step 602.

It will be appreciated that throughout description, although specific examples of the present technique have been made with reference to specific values such as 64-bit count values, and 4-bit packets transmitted over the domain boundary, the present technique may be applied to examples in where the count value and the chunks sizes are other values. Additionally, the examples in this description have been made with reference to a timestamp, but it will be appreciated that the present technique may be applied to any type of count value.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. An apparatus comprising:
control circuitry to receive a first N-bit count value in a first domain, and to determine an M-bit increment indicating value based on the first N-bit count value and a reference value, wherein M<N;
boundary circuitry to provide the M-bit increment indicating value to a second domain; and
updating circuitry to update a second N-bit count value in the second domain based on an increment represented by the M-bit increment indicating value provided by the boundary circuitry;
wherein in response to a predetermined condition, the control circuitry is configured to encode an absolute value of the first N-bit count value as a plurality of M-bit values corresponding to the first N-bit count value to be provided to the second domain by the boundary circuitry; and
in response to said plurality of M-bit values, the updating circuitry is configured to set the second N-bit count value to the absolute value represented by the plurality of M-bit values provided from the boundary circuitry.

2. The apparatus according to claim 1, wherein the control circuitry is configured to determine a first M-bit increment indicating value corresponding to an increment to be applied to a set of least significant bits of the second N-bit count value.

3. The apparatus according to claim 2, wherein the control circuitry is configured to determine a second M-bit increment indicating value corresponding to an increment to be applied to more significant bits of the second N-bit count value than said set of least significant bits.

4. The apparatus according to claim 3, wherein when a difference between the first N-bit count value and the reference value is less than a threshold value, the control circuitry is configured to provide the first M-bit increment indicating value to the boundary circuitry, and when the difference between the first N-bit count value and the reference value is greater than the threshold value, the control circuitry is configured to provide at least one of said second M-bit increment indicating value to the boundary circuitry.

5. The apparatus according to claim 4, wherein when the difference between the first N-bit count value and the reference value is greater than the threshold value, the control circuitry is configured to provide a combination of at least one second M-bit increment indicating value and zero, one or more first M-bit increment indicating values, wherein a total increment represented by the combination of increment indicating values corresponds to the difference between the first N-bit count value and the reference value.

6. The apparatus according to claim 1, wherein the predetermined condition comprises at least one of:
a power up condition;
a reset condition;
a difference between the first N-bit count value and the reference value being greater than a predetermined value, and
an error wherein the reference value is unavailable.

7. The apparatus according to claim 1, wherein the control circuitry is configured to provide a prefix packet to the boundary circuitry prior to providing the plurality of M-bit values corresponding to the first N-bit count value.

8. The apparatus according to claim 1, wherein the control circuitry is configured to perform a series of count value updating operations;
each count value updating operation comprising receiving an updated first N-bit count value, and determining based on a comparison of the updated first N-bit count value and the reference value at least one M-bit value to be provided to the boundary circuitry for updating the second N-bit count value to correspond to the updated first N-bit count value.

9. The apparatus according to claim 8, wherein the reference value for a given count value updating operation comprises the updated first N-bit count value received for a preceding count value updating operation.

10. The apparatus according to claim 8, comprising:
prediction circuitry to predict a transit time for the at least one M-bit value to be provided to the updating circuitry by the boundary circuitry, and to determine an adjusted first N-bit count value based on the predicted transit time;
wherein the control circuitry is configured to determine said at least one M-bit value to be provided by the boundary circuitry based on the adjusted first N-bit count value.

11. The apparatus according to claim 10, wherein the prediction circuitry is configured to predict the transit time based on monitoring of a length of time between the control circuitry providing a first M-bit value to the boundary circuitry for a given count value updating operation and the updating circuitry receiving a last M-bit value from the boundary circuitry for said given count value updating operation.

12. The apparatus according to claim 1 wherein the control circuitry comprises a S-bit subtractor to subtract S-bit portions of the first N-bit count value and the reference value, where S<N.

13. The apparatus according to claim 12, wherein in response to detection of an overflow condition in a subtraction performed by the S-bit subtractor, the control circuitry is configured to encode an absolute value of the first N-bit count value as a plurality of M-bit values to be provided to the second domain by the boundary circuitry.

14. The apparatus according to claim 12, wherein the updating circuitry comprises an S-bit adder to add the increment value represented by the M-bit increment value provided by the boundary circuitry to the second N-bit count value.

15. The apparatus according to claim 1, wherein the boundary circuitry comprises at least one of an M-bit bus and an M-bit FIFO buffer.

16. The apparatus according to claim 1, wherein the first domain is a first clock domain and the second domain is a second clock domain.

17. The apparatus according to claim 16, wherein the boundary circuitry comprises synchronizing circuitry for synchronizing a maximum of M bits per processing cycle with a clock signal in the second clock domain.

18. The apparatus according to claim 1, wherein the boundary circuitry comprises a level shifter for shifting a voltage level for a maximum of M bits per processing cycle.

19. The apparatus according to claim 1 wherein the first N-bit count value and the second N-bit count value comprise first and second timestamps.

20. An apparatus comprising:
control circuitry to receive a first N-bit count value in a first domain, and to determine an M-bit increment indicating value based on the first N-bit count value and a reference value, wherein M<N;
boundary circuitry to provide the M-bit increment indicating value to a second domain; and
updating circuitry to update a second N-bit count value in the second domain based on an increment represented by the M-bit increment indicating value provided by the boundary circuitry;
wherein the M-bit increment indicating value comprises an H-bit header and a P-bit payload, where H+P=M and the H-bit header is indicative of which bits of the second N-bit count value are to be updated by an increment indicated by the P-bit payload.

21. The apparatus according to claim 20, wherein the updating circuitry is configured to update the second N-bit count value by an increment of INC, where:

$$INC = Q \times 2^{jP}$$

where Q is the value represented by the P-bit payload and j is the value represented by the H-bit header.

22. A method comprising:
receiving a first N-bit count value in a first domain;
determining an M-bit increment indicating value based on the first N-bit count value and a reference value, wherein M<N;
providing the M-bit increment indicating value to a second domain using boundary circuitry; and updating a second N-bit count value in the second domain based on an increment represented by the M-bit increment indicating value provided by the boundary circuitry;

wherein in response to a predetermined condition, an absolute value of the first N-bit count value is encoded as a plurality of M-bit values corresponding to the first N-bit count value to be provided to the second domain by the boundary circuitry; and in response to said plurality of M-bit values, the second N-bit count value is set to the absolute value represented by the plurality of M-bit values provided from the boundary circuitry.

* * * * *